July 31, 1962 W. C. PEASE III 3,046,872
FLUID PRESSURE CONTROL MECHANISM FOR BALING PRESSES
Filed Nov. 20, 1959 3 Sheets-Sheet 1

INVENTOR.
WILLIAM C. PEASE III
BY
Jennings, Carter & Thompson
ATTORNEYS

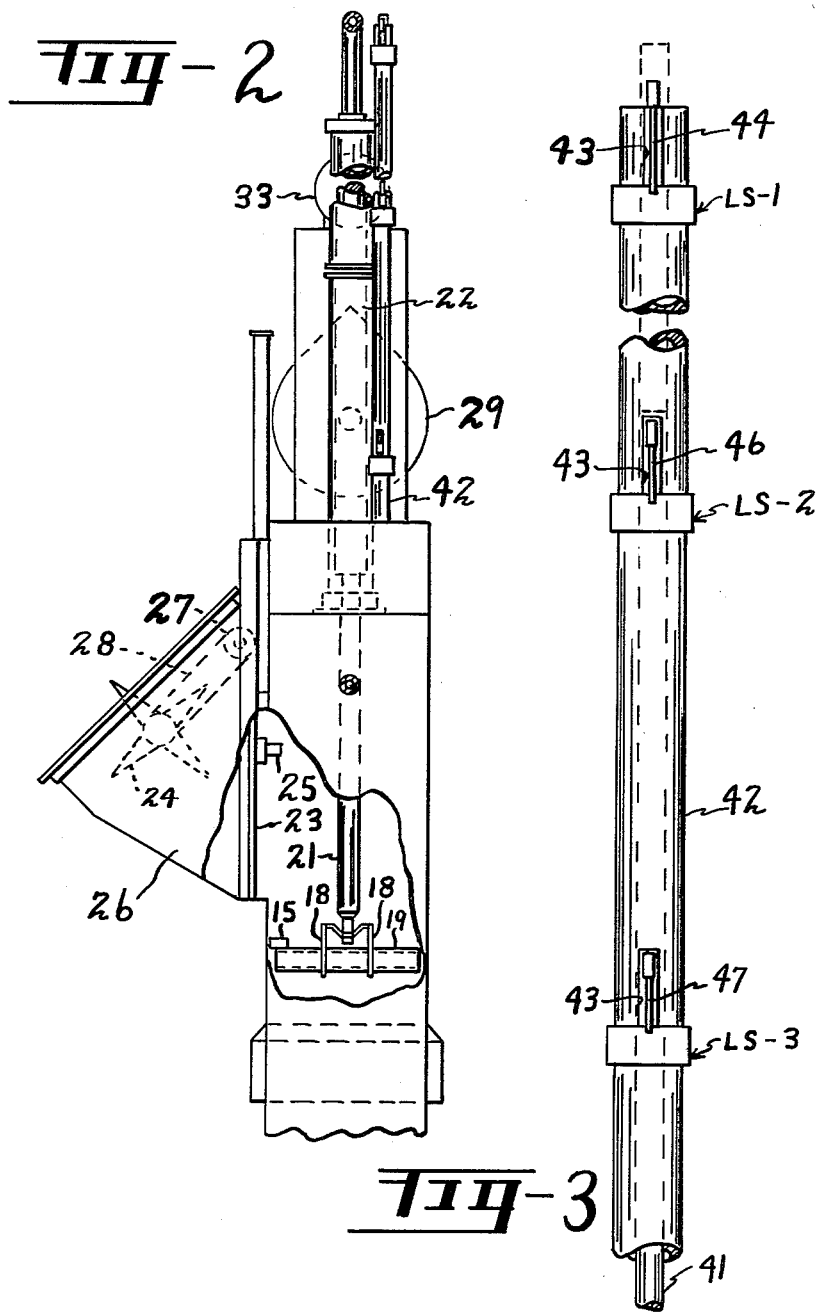

July 31, 1962    W. C. PEASE III    3,046,872
FLUID PRESSURE CONTROL MECHANISM FOR BALING PRESSES
Filed Nov. 20, 1959    3 Sheets-Sheet 3

INVENTOR.
WILLIAM C. PEASE III
BY
Jennings, Carter & Thompson
ATTORNEYS

United States Patent Office 3,046,872
Patented July 31, 1962

3,046,872
FLUID PRESSURE CONTROL MECHANISM
FOR BALING PRESSES
William C. Pease III, Columbus, Ga., assignor to Lummus Cotton Gin Company, a corporation of Georgia
Filed Nov. 20, 1959, Ser. No. 854,493
14 Claims. (Cl. 100—52)

This invention relates to trampers for baling presses and more particularly to a tramper in which fluid pressure means drives the tramper and is automatically stopped when a predetermined fluid pressure is reached upon contact of the tramper foot with material in the press box.

In my prior Patent No. 2,764,932, issued October 2, 1956, I show means for automatically stopping the movement of a tramper in a press box comprising an electric motor to drive the tramper and which was deenergized when a predetermined amount of current was drawn thereby. As resistance to the tramper movement increased due to packing of material in the press box, the current drawn by the motor likewise increased until a predetermined amount was drawn at which point the motor was deenergized by control means and the tramper stopped.

While the apparatus disclosed in the above mentioned patent has operated satisfactorily, it has been found that more accurate weight control of the bale can be obtained by the use of fluid pressure means to actuate the tramper and by controls operable responsive to a predetermined fluid pressure to stop the movement of the tramper. This is true since hydraulic fluid pressure is directly related to the pressure exerted by the tramper against material in the press box and does not depend on any variable which fluctuates slightly at times, such as voltage fluctuation in an electrical power supply or the like. A predetermined fluid pressure in the supply line to the fluid pressure cylinder driving the tramper actuates a pressure switch to reverse the movement of the tramper without any intermediate controls or devices. Further, there is no time delay between the predetermined pressure being reached in the fluid supply line and the stopping or reversing of the tramper.

It is an object of the present invention to provide fluid pressure actuated controls in a baling press automatically to stop the movement of a fluid pressure actuated tramper in an associated press box when a predetermined fluid pressure is reached through contact of the tramper foot with material in the press box.

A more specific object of the invention is to provide a baling press having a fluid pressure actuated tramper and a pressure responsive electric switch operatively connected to the pressure line of the tramper to cause the movement of the tramper to be reversed when the bale reaches a predetermined compaction.

A further object of the invention is to provide in combination with the electric pressure switch and the fluid pressure actuated tramper, upper and intermediate limit switches spaced at intervals and actuated by the movement of the tramper to reverse and stop, respectively, the movement of the tramper. Means are provided to supply material to the press box when the tramper is in its uppermost position and the upper limit switch is operatively connected to such means and permits the actuation thereof only when the tramper is in its raised position. After the fluid pressure switch has been actuated the intermediate switch stops the movement of the tramper after it leaves the press box to permit the rotation thereof.

Apparatus embodying features of my invention is shown in the accompanying drawings, forming a part of this application, in which:

FIG. 2 is a fragmentary side elevational view, looking generally along line 2—2 of FIG. 1 and showing means for feeding material into the press box;

FIG. 3 is an enlarged fragmentary elevational view of a cam rod movable with the tramper and the guide therefor showing a plurality of limit switches mounted on the guide and actuated by the movement of the cam rod; and, FIG. 4 is a schematic diagram of the combined electrical and fluid circuits to control the operation of the baling press shown in FIG. 1.

Figure 1:
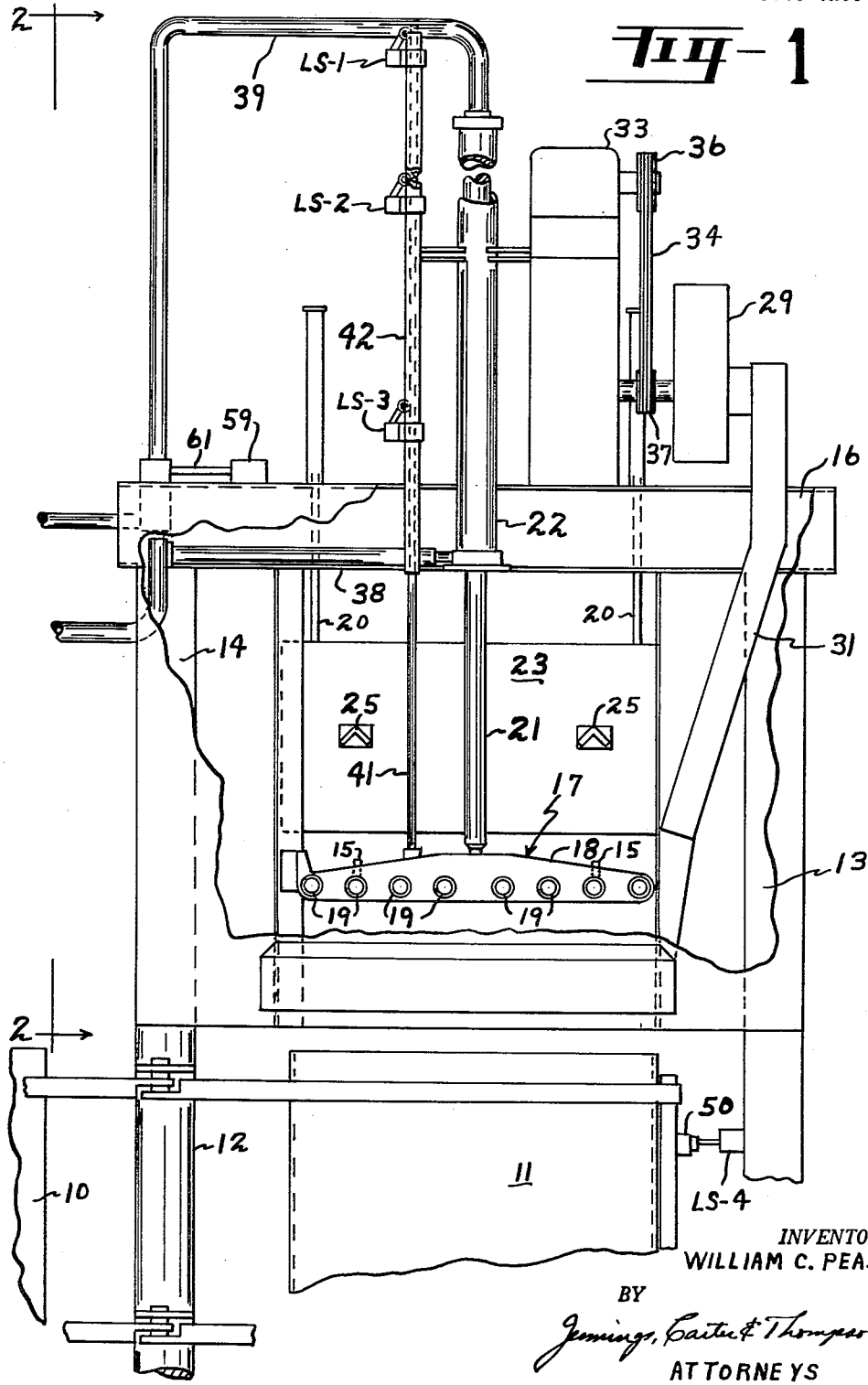
FIG. 1 is a partially diagrammatic, front elevational view, partly broken away, and showing the upper section of a double box press with the tramper in an intermediate position.

Referring now to the drawings for a better understanding of my invention, I show in FIGS. 1 and 2 a two box baling press having a pair of press boxes 10 and 11 mounted for rotary movement about a vertical axis 12. A supporting frame is mounted over the press boxes 10, 11 and comprises vertical beam members 13 and 14 connected at their upper ends by a horizontal member 16.

A tramping unit is mounted on the supporting frame and comprises a tramper indicated generally by the numeral 17 having a pair of spaced, parallel supporting plates 18 between which extend a plurality of pipes 19 forming a tramper foot. Plates 18 are connected to the lower end of a piston rod 21 which extends downwardly from a hydraulic fluid pressure cylinder 22. The tramper unit shown in FIGS. 1 and 2 is especially adapted for use on wood pulp and the like and the spaced tubular members or pipes 19 have been found to be very effective in compressing this particular type of material. My invention is not limited in use to any specific material, but can be used on various types of material.

The tramper 17 shown in FIGS. 1 and 2 is at an intermediate position and upon movement to its uppermost position, a gate 23 is raised by tramper 17 to permit the flow of material into the press box 11. Gate 23 has guide rods 20 slidably mounted in guides and has laterally extending lugs 25 engaging extensions 15 on pipes 19 when tramper 17 moves to its uppermost position so that gate 23 is raised by tramper 17. Gate 23 closes by gravity upon lowering of tramper 17. A rotary kicker 24 is mounted in a charge chamber 26 which receives wood pulp or other material from a suitable source of supply (not shown). Kicker 24 is driven by motor 27 through sprocket 28 shown in dotted lines in FIG. 2. Motor 27 is energized when tramper 17 is in its uppermost position and when gate 23 is open as will be explained further.

To remove wood pulp dust and fly ash or the like, a centrifugal suction fan 29 may be provided and suction is exerted through a suction conduit 31 leading from press box 11. Fan 29 may be driven by motor 33 through belts 34 and pulleys 36 and 37.

Fluid pressure cylinder or ram 22 is connected by suitable fluid pressure lines 38 and 39 which in turn are operatively connected to a suitable pump and reservoir (not shown in FIGS. 1-3). Upper, intermediate and lower limit switches LS-1, LS-2, and LS-3, respectively, are positioned adjacent tramper 17 and are actuated in synchronism with the movement of tramper 17 at different heights of the tramper. A cam or switch control rod 41 is connected to tramper 17 and moves therewith. Cam rod 41 is slidably mounted within a tubular guide 42 adjacent which the limit switches LS-1, LS-2, and LS-3 are mounted. As shown in FIG. 3, slots 43 are provided in guide 42 and switch arm 44 of switch LS-1, switch arm 46 of switch LS-2, and switch arm 47 of switch LS-3 project through slots 43 and are actuated by the rod 41 as it moves within guide 42. A fourth limit switch LS-4 is positioned on the stationary frame (see FIG. 1) adjacent the press box 11 and is opened upon rotation of press box 11 while being closed upon the positioning of press box 11. A lug 50 on press box 11 actuates switch LS-4. Thus, my apparatus can be operated only when press box 11 is in proper tramping position.

Figure 4:
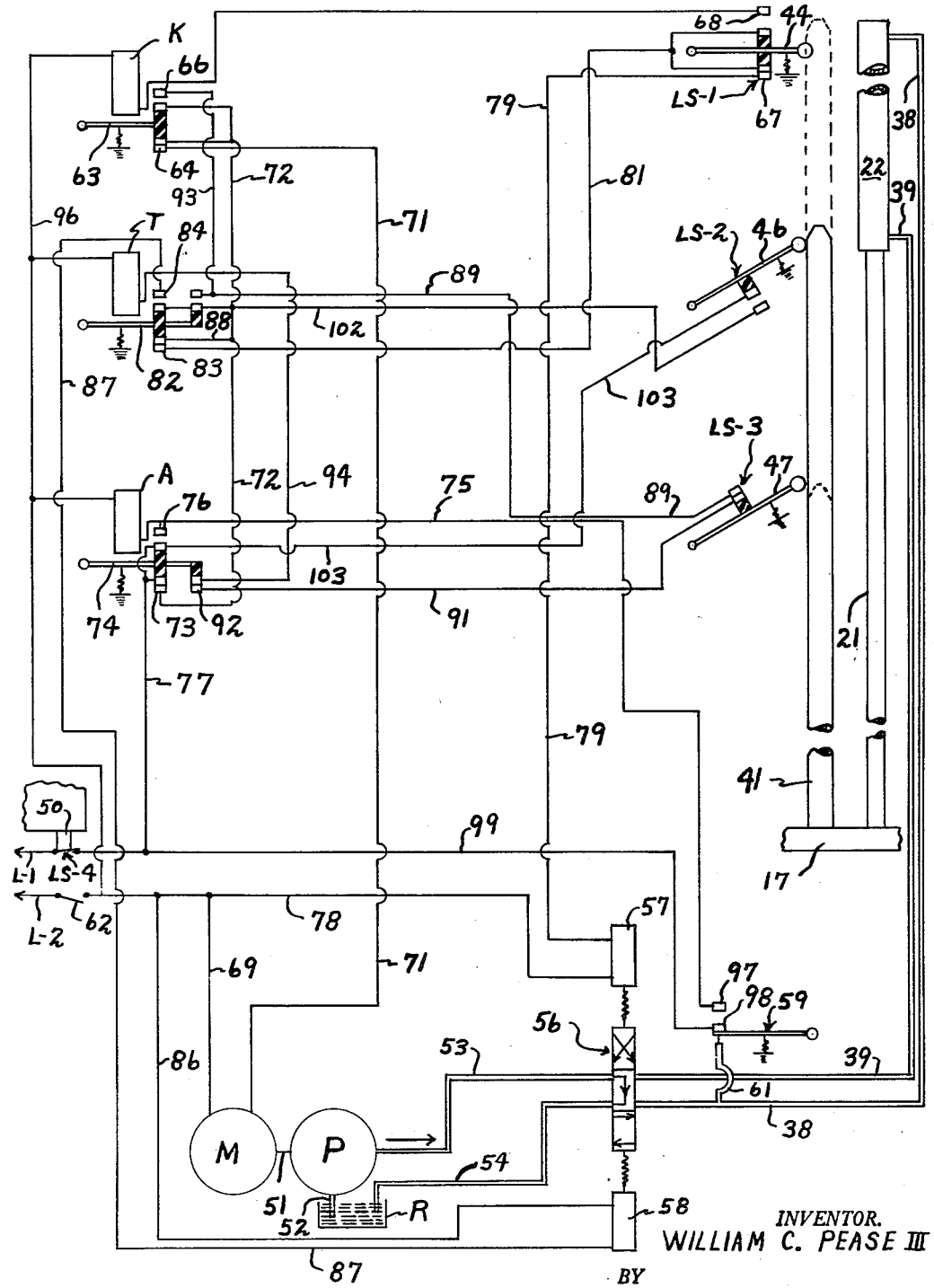

Referring now to FIG. 4 in which a schematic diagram is shown of the combined electrical and fluid circuits, a fluid pressure pump P is shown which is driven by electric motor M through a drive connection 51. Fluid is supplied from reservoir R through fluid line 52 to pump P and line 53 supplies fluid under pressure to cylinder 22. Fluid is returned to reservoir R by return line 54.

A four-way, double solenoid hydraulic valve 56 is mounted across fluid lines 38 and 39 and controls the flow and direction of fluid in lines 38 and 39. Fluid is returned from line 53 through valve 56 and return line 54 to reservoir R when valve 56 is in neutral position as shown in FIG. 4 with pump P energized. Solenoid 57 is provided adjacent one end of valve 56 and when energized moves valve 56 to its uppermost position to supply fluid to cylinder 22 through line 39 and to return fluid to reservoir R through line 38 thereby moving tramper 17 upwardly. Solenoid 58 is provided adjacent the other end of valve 56 and when energized moves valve 56 to its downward position allowing the supplying of fluid through line 38 to cylinder 22 and returning fluid to reservoir R through line 39 thereby moving tramper 17 downwardly.

A fluid pressure electric switch 59 (also see FIG. 1) is connected to conduit 38 by a conduit 61 and is actuated upon the fluid in lines 38 and 61 reaching a predetermined pressure. Switch 59 is adjustable and can be set to be actuated at various selected fluid pressures. Thus, on the downward movement of tramper 17 with fluid being supplied thereto through line 38, resistance to the downward movement of tramper 17 by material in the press box results in an increased fluid pressure in line 38. Upon this resistance or fluid pressure reaching a predetermined amount, switch 59 is actuated to stop the movement of tramper 17 as will be explained below.

Electrical power is supplied through lines L-1 and L-2 from a suitable source of power (not shown). A master switch 62 controls the entire electrical circuit and is closed in the operation of my apparatus. Limit switch LS-4 is also closed while press box 11 is in tramping position. A relay K which energizes motor 27 for the kicker 24 is shown having a switch arm 63 movable between stationary contacts 64 and 66. Relay K is energized only when switch LS-1 which is movable between stationary contacts 67 and 68 is in its upper raised position closing contact 68. Thus, kicker 24 is actuated only when tramper 17 is in its uppermost position with gate 23 open. Upon closing of switch 62, pump motor M is energized through line 69, line 71, stationary contact 64 of relay K, arm 63, line 72, and a stationary contact 73 of a relay A. Relay A is connected through line 75 to pressure switch 59 and is energized when switch 59 is closed. Arm 74 of relay A is movable between stationary contact 73 and stationary contact 76. From arm 74 the circuit to energize motor M continues through line 77 to line L-1. Motor M is deenergized upon energizing of relay K since contact 64 is opened. Thus, motor M is always deenergized when the kicker motor 27 is energized by relay K.

Solenoid 57 is energized through lines 78, 79, contact 67 of switch LS-1, arm 44, line 81 leading therefrom, and through switch 82 of a timing relay T. Switch arm 82 is movable between stationary contacts 83 and 84. The circuit to energize solenoid 57 is completed through arm 82, line 72, contact 73, arm 74, and line 77 to power line L-1.

The circuit to energize solenoid 58 for the downward movement of tramper 17 is through line 86 to solenoid 58 and line 87 therefrom to contact 84 at the timing relay T. Timing relay T is a delay timer which is set and timed out before solenoid 58 is energized to permit the reversal of movement of tramper 17. Thus, tramper 17 remains in its uppermost position a sufficient time for a charge to be placed in the press box by kicker 24. When the timer times out after a charge has been placed in press box 11, switch arm 82 is actuated and a circuit is completed to energize solenoid 58 through line 87, contact 84, switch arm 82, line 88, line 72, contact 73 of relay A and line 77 to power line L-1.

The tramper 17 is shown in FIG. 4 in its intermediate position, the position at which it comes to rest after pressure switch 59 has been actuated and the press box 11 is ready for rotation. After a filled press box 11 has been rotated and an empty press box 11 is positioned under tramper 17, switch 62 is closed. Upon closing switch 62, motor M is energized through line 69, line 71, relay K and relay A which are both deenergized, and line 77 to power line L-1. Solenoid 57 is also energized immediately upon closing of switch 62 through the previously mentioned circuit comprising switch LS-1, relay T and relay A through line 77 to power line L-1. Pump P is started by energizing of motor M and valve 56 moves to its upward position thereby supplying fluid to cylinder 22 through line 39 to move the tramper 17 upwardly. Tramper 17 moves upwardly until switch arm 44 of switch LS-1 is engaged by cam rod 41. Gate 23 moves upwardly with tramper 17 and is fully opened when tramper 17 reaches its upper position.

Upon tramper 17 reaching its uppermost position and actuating switch LS-1 to move switch arm 44 into contact with contact 68, solenoid 57 is deenergized to stop the movement of tramper 17. Upon closing of contact 68, relay K is energized through switch LS-1, line 81, contact 83, arm 82, line 72, contact 73 and line 77. The energizing of relay K starts motor 27 to drive kicker 24 and opens contact 64 to deenergize motor M and likewise pump P. Closing of arm 63 with contact 66 starts the timer through the following circuit: line 77, through arm 74, contact 73, line 72, arm 63, contact 66, line 93, line 89, switch LS-3, line 91, contact 92, line 94, to timer relay T and through line 96 to power line L-2. Relay T is a relay for a delay timer and the closing of the circuit starts the timer. When the timer times out, switch 82 is thrown to deenergize kicker K allowing switch arm 63 to return to closed position with contact 64 thereby energizing motor M and starting pump P. Solenoid 58 is also energized through line 86, line 87, contact 84, switch arm 82, line 88, line 72, contact 73, switch arm 74 and line 77 to power line L-1.

Upon energizing of solenoid 58, valve 56 is moved to its downward position with fluid line 53 in fluid communication with line 38 to move tramper 17 downwardly. Tramper 17 moves downwardly until limit switch LS-3 or pressure switch 59 is actuated. It should be noted that if a predetermined pressure is reached in fluid line 38 before tramper 17 reaches its downward position to actuate switch LS-3, switch 59 is actuated and limit switch LS-3 has no effect on the circuit. In other words, either switch LS-3 reverses the movement of tramper 17 or pressure switch 59 reverses the movement of tramper 17.

If there is less than a predetermined amount of material within press box 11, tramper 17 moves downwardly until switch LS-3 is opened. When switch LS-3 is opened, timer T is deenergized. When timer T is deenergized, switch arm 82 returns to the position shown in FIG. 4 thereby resulting in deenergizing solenoid 58 which stops the downward movement of tramper 17. The movement of switch arm 82 to close contact 83 energizes solenoid 57. Upon energizing of solenoid 57, the valve 56 is moved to its upward position and fluid pressure line 53 is in fluid communication with line 39 to move the tramper 17 upwardly. If switch LS-3 is actuated and reverses the movement of tramper 17, the tramper does not stop when switch LS-2 is opened as solenoid 57 remains energized through LS-1, switch arm 74 and line 77. Thus, tramper 17 reciprocates automatically until the material in press box 11 reaches a compaction so that resistance to the tramper results in actuation of switch 59.

As the material in the press box increases in volume, tramper 17 finally moves downwardly less than enough to actuate switch LS–3. Pressure thus builds up in line 38 to actuate switch 59 before tramper 17 reaches the end of its downward stroke.

When a predetermined pressure is reached in line 38, switch 59 is actuated to close contacts 97 and 98 which energize relay A through lines 99 and 75. When relay A is energized, switch arm 74 is actuated to close arm 74 with contact 76 and to open contacts 73 and 92. Thus, energizing of relay A causes timing relay T to be deenergized. When relay T is deenergized, solenoid 58 is likewise deenergized and solenoid 57 is energized to actuate valve 56 and reverse the flow of fluid in lines 38 and 39. Tramper 17 moves upwardly until switch LS–2 is contacted by cam rod 41 at the position shown in FIG. 4. When switch LS–2 is opened, solenoid 57 is deenergized to stop the movement of ram 17. Solenoid 58 is not energized, as contacts 73 and 92 are opened when relay A is energized. Motor M is also deenergized along with pump P when switch LS–2 is opened along with contacts 73 and 92.

It should be noted that when relay A is energized, switch LS–2 is closed and keeps solenoid 57 energized through line 79, switch LS–1, line 81, contact 83, switch 82, line 102, switch LS–2, line 103 and line 77 to power line L–1. Likewise, motor M is kept energized even though relay A is energized through line 71, contact 64, line 72, line 102, switch LS–2, line 103, switch arm 74 and line 77 to power line L–1. In this position, press box 11 is now ready for rotation and upon a manual actuation of means, such as disclosed in assignee's application Serial No. 746,553, filed July 3, 1958, now Patent No. 2,963,959, press box 11 rotates to open switch LS–4 which deenergizes relay A. Upon the arrival of an empty press box 11, switch LS–4 is closed and my apparatus is ready to begin a new tramping operation.

In a short summary, the operation of the apparatus is as follows:

(1) Switch 62 is closed energizing solenoid 57 and motor M to drive pump P and move tramper 17 upwardly.

(2) Switch LS–1 is opened to stop the movement of tramper 17 and relay K is energized to start the kicker 24. Motor M and pump P are deenergized and the timer relay T is started.

(3) Timer T times out to start pump P and deenergize relay K to stop kicker 24. Solenoid 58 is energized and tramper 17 moves downwardly.

(4) As fluid pressure increases from resistance to ram 17, switch 59 is actuated to energize relay A. Timer T is deenergized along with solenoid 58. Solenoid 57 is energized and tramper 17 moves upwardly.

(5) Switch LS–2 is opened to deenergize solenoid 57 and motor M along with pump P.

(6) Switch LS–4 is opened by rotation of press box to deenergize relay A.

(7) Closing of switch LS–4 starts a new cycle.

From the foregoing, it will be understood that I have provided a baling press that is very accurate in forming bales of materials, such as wood pulp, of a uniform bale density. The tramper is fluid actuated and upon a predetermined pressure being reached by contact of the tramper with material in the press box, controls are actuated to reverse the movement of the ram. There are no intermediate controls between the fluid pressure in the cylinder of the tramper and the actuation of the pressure switch is instantaneous upon a predetermined fluid pressure being reached in the ram cylinder. There are no variables which may fluctuate and the fluid pressure system is connected with the electrical system to control the actuation of the motor to drive the fluid pump. Limit switches are positioned at spaced heights and are actuated by the movement of the tramper. The limit switches control the movement of the tramper and reverse the movement of the tramper at its upper and lower positions.

An intermediate limit switch stops the tramper and ceases the entire cycle. A kicker to charge the press box is provided and is actuated only when the ram reaches its upper position and while the motor for driving the pump is deenergized. The intermediate limit switch stops the movement of the tramper after a pressure switch has been actuated with the tramper being stopped out of the press box so that it can be rotated. Upon rotation of the press box, the entire control system is deenergized and cannot be energized until another press box is properly positioned beneath the tramper.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. The combination with a baling press having a press box and a tramper associated with the press box for packing material therein, fluid pressure means to reciprocate said tramper, apparatus for automatically stopping the downward movement of the tramper within the press box when a predetermined fluid pressure is reached in the fluid pressure means through contact of the tramper with the material in the press box, said apparatus comprising fluid pressure lines to convey fluid to and away from the fluid pressure means to reciprocate said tramper, means to pump fluid through said fluid lines, means operatively connected to said fluid pump to drive said pump, a pressure switch operatively connected to the pressure within said fluid pressure means when said tramper is moving on its packing stroke and being actuated when said fluid pressure reaches a predetermined amount in said pressure line, valve means operatively connected to said fluid pressure lines and to said pressure switch to permit the reversal of the flow of fluid in said fluid lines when said pressure switch is actuated by said predetermined fluid pressure, means independent of the pressure switch to reverse the downward movement of the tramper when it reaches a predetermined position before the predetermined fluid pressure is reached, control means operatively connected to said pressure switch and effective only upon actuation of the pressure switch to stop the movement of the tramper out of the press box, and additional controls independent of the pressure switch to stop the tramper in its upper position out of the press box.

2. In a baling press having a press box and a tramper associated with the press box for packing material therein, fluid pressure means to reciprocate said tramper, apparatus for automatically stopping the downward movement of the tramper when a predetermined fluid pressure is reached through contact of the tramper with the material in the press box, said apparatus comprising fluid pressure lines to convey fluid to and away from the fluid pressure means to reciprocate said tramper, means to pump fluid through said fluid lines, power means operatively connected to said fluid pump to drive said pump, a valve operatively connected to said fluid lines to reverse the flow of fluid in said lines to said fluid pressure means when actuated and thereby to reverse the direction of movement of the tramper, a solenoid operatively connected to each end of said valve, one solenoid being energized when the tramper is moving upwardly and the other solenoid being energized when the tramper is moving downwardly, controls responsive to the movement of the tramper being actuated upon the tramper reaching its uppermost position and operatively connected to said solenoids to actuate said valve through said solenoids and reverse the direction of movement of said tramper, and pressure responsive means operatively connected to the pressure line of said fluid pressure means when said tramper is moving on its packing stroke and being actuated when said fluid pressure reaches a predetermined amount in said pressure line, said pressure responsive means being operatively connected to said solenoids and actuating said valve through said solenoids to reverse the movement of the tramper.

3. The combination with a baling press having a press box and a tramper associated with the press box for packing material therein, fluid pressure means to reciprocate said tramper, apparatus for automatically stopping the movement of the tramper in the press box when a predetermined fluid pressure is reached through contact of the tramper with material in the press box, said apparatus comprising fluid pressure lines to convey fluid to and away from the fluid pressure means to reciprocate said tramper, means to pump fluid through said fluid lines, means operatively connected to said pump to drive said pump, a pressure responsive switch operatively connected to the pressure line of said fluid pressure means when said tramper is moving on its packing stroke and being actuated when said fluid pressure reaches a predetermined amount in said pressure line, valve means operatively connected to said fluid pressure lines and responsive to the actuation of said pressure switch to permit reversal of the flow of fluid in the fluid lines and an upward movement of the tramper, controls at upper and intermediate vertical positions of the tramper actuated by movement of the tramper and operatively connected to said valve means, said tramper effective to actuate controls at said upper position as it is moving upwardly to reverse said valve means and thereby change the direction of said tramper to move said tramper downwardly, said pressure switch being actuated by the tramper at its lowermost position to reverse the movement thereof, and said tramper actuating controls at said intermediate position as it is moving upwardly to stop the movement of the tramper after the pressure switch has been actuated.

4. The combination with a baling rotatable press having a press box and a tramper associated with the press box for packing material therein, a fluid pressure cylinder to reciprocate said tramper, apparatus for automatically stopping the movement of the tramper toward the press box when a predetermined fluid pressure is reached in the cylinder through contact of the tramper with the material in the press box, said apparatus comprising fluid pressure lines to convey fluid to and away from the cylinder to reciprocate said tramper, means to pump fluid through said fluid lines, means operatively connected to said pump to drive said pump, fluid pressure responsive means operatively connected to the pressure within said cylinder when said tramper is moving on its packing stroke and being actuated when said fluid pressure reaches a predetermined amount in said pressure line, valve means operatively connected to said fluid pressure lines and responsive to the actuation of said pressure responsive means to permit reversal of the flow of fluid in the fluid lines and an an upward movement of the tramper, control means operatively connected to said pressure switch and effective only upon actuation of the pressure switch to stop the movement of the tramper immediately after it leaves the press box to permit rotation of the press box, and additional control means independent of the pressure switch and operatively connected to said valve means to stop the tramper in its upward movement out of the press box thereby to allow reversal of the tramper.

5. The combination with a baling press having a press box and a vertically reciprocable tramper associated with the press box for packing material therein, a fluid pressure cylinder to reciprocate said tramper, apparatus for automatically stopping the movement of the tramper toward the press box when a predetermined fluid pressure is reached in the cylinder through contact of the tramper with material in the press box, said apparatus comprising fluid pressure lines to convey fluid to and away from the cylinder to reciprocate said tramper, means to pump fluid through said fluid lines, means operatively connected to said pump to drive said pump, a pressure switch operatively connected to the pressure line of said cylinder when said tramper is moving on its packing stroke and being actuated when said fluid pressure reaches a predetermined amount in said pressure line, a valve operatively connected to said fluid pressure lines and responsive to the actuation of said pressure switch to permit reversal of the flow of fluid in the fluid lines and an upward movement of the tramper, a solenoid operatively connected to each end of said valve to actuate said valve for reversing the flow of fluid to said cylinder, upper and intermediate electrical controls operatively connected to said solenoids and being actuated by the movement of said tramper, said upper electrical controls being actuated when the tramper reaches its uppermost position and operable to deenergize one solenoid and to energize the other solenoid thereby actuating said valve means to reverse the direction of movement of said tramper, and said intermediate controls being actuated by the upward movement of said tramper and operable to hold both solenoids deenergized and move said valve to a neutral position to cease the flow of fluid to said tramper and stop the movement thereof after the pressure switch is actuated.

6. In a baling press having a press box and a reciprocable tramper actuated by a fluid cylinder and associated with the press box for packing material therein, apparatus for automatically stopping the downward movement of the tramper when a predetermined fluid pressure is reached in the cylinder through contact of the tramper with the material in the press box, said apparatus comprising fluid pressure lines to convey fluid to and away from the cylinder to reciprocate said tramper, means to pump fluid through said fluid lines, an electric motor operatively connected to said pump to drive said pump, a valve operatively connected to said fluid lines to reverse or stop the flow of fluid in said lines to said tramper when actuated, a solenoid operatively connected to each end of said valve to actuate said valve for reversing the flow of fluid to said tramper, lower, intermediate, and upper controls operatively connected to said solenoids and being operable responsive to the movement of said tramper, said upper controls being actuated by said tramper when it reaches its uppermost position to deenergize one solenoid and energize the other solenoid thereby to actuate said valve and reverse the direction of movement of said tramper, said lower controls being operatively connected to the pressure line of the cylinder in the downward movement of the tramper and operable responsive to a predetermined pressure in said pressure line reached through contact of the tramper with the material in the press box to reverse said valve through said solenoids and thereby reverse the downward movement of said tramper, and said intermediate controls operable responsive to the upward movement of said tramper to deenergize both solenoids and said electric motor after said lower controls have been actuated thereby stopping the upward movement of said tramper at said intermediate controls.

7. In a material baling press having a press box and a reciprocable tramper actuated by a fluid cylinder and associated with the press box for packing material therein, apparatus for automatically stopping the downward movement of the tramper when a predetermined fluid pressure is reached in the cylinder through contact of the tramper with the material in the press box, said apparatus comprising fluid pressure lines to convey fluid to and away from the cylinder to reciprocate said tramper, a pump to pump fluid through said fluid lines, an electric motor for driving said pump, a valve operatively connected to said fluid lines to reverse or stop the flow of fluid in said lines to said tramper when actuated, a solenoid operatively connected to each end of said valve to actuate said valve for reversing the flow of fluid to said tramper, a power source supplying electrical energy to said solenoids, electrical circuits connecting said power source to said solenoids, a timer in series with each of said solenoids and permitting the energizing of only one of the solenoids at one time, one solenoid being energized on the upward movement of the tramper and the other solenoid being energized on the downward movement of the tramper, a lower electrical switch actuated by a predetermined pressure reached in the pressure line supplying fluid to the cylinder, said timer being in series with said lower switch and being deenergized when said lower switch is actuated by said tramper to alternate the energizing of said solenoids and thereby actuate said valve and reverse the direction of movement of said tramper, upper and intermediate switches actuated by the movement of said tramper and operatively connected to said solenoids, said upper switch being actuated when said tramper reaches its uppermost position to energize said timer and thereby alternate the energizing of the solenoids to reverse the movement of said tramper, and said intermediate switch being actuated on the upward movement of said tramper to deenergize said motor and both of said solenoids after the actuation of said lower switch thereby stopping the movement of said tramper.

8. The combination defined in claim 7 further characterized in that a lower limit switch is positioned to be actuated by said tramper on the downward movement thereof to reverse the direction of movement of said tramper, said limit switch being operatively connected to said solenoids through said timer to alternate the energizing of said solenoids and being actuated only when said lower electrical switch is not actuated and after the tramper has reached a predetermined downward position.

9. In a baling press having a press box and a reciprocable tramper actuated by a fluid pressure cylinder and associated with the press box for packing material therein, fluid pressure lines to convey fluid to and from the cylinder to reciprocate said tramper, a pump to pump fluid through said fluid lines, electrical means for driving said pump, means to reverse the downward movement of the tramper when a predetermined fluid pressure is reached, a charging chamber adjacent the press box to supply material to be compressed to the press box, a gate between the charging chamber and the press box and being closed during the movement of said tramper in the press box, a kicker to aid in moving the material from the charging chamber to the press box, electrical means to drive said kicker, an electrical switch operatively connected to the kicker drive means and being actuated when the tramper reaches its upper position to actuate said kicker, an electrical timer in series with said kicker drive means and holding said kicker drive means energized for a predetermined time in the upper position of the tramper, said gate being opened by the upward movement of said tramper and remaining open while the tramper is in its upper position, and said switch being operatively connected to said pump drive means to deenergize said pump drive means and stop the movement of the tramper upon energizing of said kicker drive means.

10. In a baling press having a press box and a reciprocable tramper actuated by a fluid cylinder and associated with the press box for packing material therein, apparatus for automatically stopping the downward movement of the tramper when a predetermined fluid pressure is reached in the cylinder through contact of the tramper with material in the press box, said apparatus comprising fluid pressure lines to convey fluid to and away from the cylinder to reciprocate said tramper, a pump to pump fluid through said fluid lines, means for driving said pump, a valve operatively connected to said fluid lines to control the flow of fluid to said cylinder, a fluid pressure switch operatively connected to the pressure line of said cylinder when said tramper is moving on its packing stroke and being actuated when said fluid pressure reaches a predetermined amount in said pressure line, said fluid pressure switch being operatively connected to said valve for actuation thereof to reverse the downward movement of the tramper, a charging chamber adjacent the press box to supply material to be compressed to the press box, a gate between the charging chamber and the press box to prevent material being discharged in the press box during the movement of the tramper in the press box and being opened when the tramper is in its upper position, a kicker in the charging chamber to aid in moving material from the charging chamber to the press box, means to drive said kicker, a switch operatively connected to said kicker drive means and being actuated by the tramper when the tramper reaches its upper position to energize the kicker drive means and to stop the movement of the tramper, and a timer in series with said kicker drive means and holding said kicker drive means energized for a predetermined time in the upper position of the tramper.

11. In a baling press having a rotatable press box and a tramper associated with a press box to pack material therein, a fluid pressure cylinder to reciprocate said tramper, apparatus for automatically stopping the movement of the tramper toward the press box when a predetermined fluid pressure is reached in the fluid pressure means through contact of the tramper with the material in the press box, said apparatus comprising fluid pressure lines to convey fluid to and away from the fluid pressure means to reciprocate said tramper, means to pump fluid through said fluid lines, means operatively connected to said fluid pump to drive said pump, a pressure switch operatively connected to the pressure line of said fluid pressure means when said tramper is moving on its packing stroke and being actuated when said fluid pressure reaches a predetermined amount in said pressure line, valve means operatively connected to said fluid pressure lines and to said pressure switch to permit the reversal of the flow of fluid in said fluid lines when said pressure switch is actuated by said predetermined fluid pressure, an intermediate limit switch actuated by the movement of said tramper and operable after said pressure switch is actuated to stop the movement of the tramper out of the press box, a master limit switch opened by the movement of the rotatable press box to prevent the movement of the tramper and being closed upon the positioning of the press box under the tramper to permit the tramper to move, and upper switch means actuated by the tramper at its uppermost position and operatively connected to said valve means to actuate said valve means and reverse the upward movement of the tramper at said uppermost position.

12. In a baling press having a press box and a tramper associated with the press box for packing material therein, fluid pressure drive means to reciprocate the tramper, apparatus for automatically stopping the movement of the tramper within the press box when a predetermined fluid pressure is reached within the drive means through contact of the tramper with material in the press box, said apparatus comprising conduits to convey fluid to and away from the drive means to reciprocate said tramper, means to supply fluid under pressure to the drive means through said conduits, a pressure switch operatively connected to the operating pressure within the drive means when the tramper is moving on its packing stroke and actuated thereby when the operating pressure reaches a predetermined value, means to reverse the movement of the tramper when it reaches a predetermined position before the predetermined fluid pressure is reached, means to reverse the flow of fluid in said conduits when the pressure switch is actuated by said predetermined fluid pressure, and control means in circuit with said pressure switch to stop the movement of the tramper when the tramper is out of the press box.

13. In a baling press having a press box and a tramper associated with the press box for packing material therein, reversible fluid pressure drive means to reciprocate said tramper, a pressure switch operatively connected to the operating pressure within the fluid pressure means when the tramper is moving on its packing stroke and actuated thereby when the operating pressure reaches a predetermined value, conduits to convey fluid to and from the drive means to reciprocate the tramper, valve means operatively connected to the conduits to reverse the flow of fluid in the conduits, means to supply material to the press box when the tramper is out of the press box, means operatively connected to said valve means for actuation thereof to reverse the movement of the tramper when it reaches a predetermined downward position, and control means operatively connected to said pressure switch and effective upon actuation of the pressure switch by the predetermined pressure to stop the movement of the tramper when the tramper is out of the press box.

14. In a baling press having a press box and a tramper associated with the press box for packing material therein, fluid pressure drive means to reciprocate the tramper, apparatus for automatically stopping the movement of the tramper within the press box when a predetermined fluid pressure is reached within the drive means through contact of the tramper with material in the press box, said apparatus comprising conduits to convey fluid to and away from the drive means to reciprocate said tramper, means to supply fluid under pressure to the drive means through said conduits, a pressure switch operatively connected to the operating pressure within the drive means when the tramper is moving on its packing stroke and actuated thereby when the operating pressure reaches a predetermined value, valve means operatively connected to said conduits to reverse the flow of fluid in the conduits, means operatively connected to said valve means for actuation thereof to stop the downward movement of the tramper when it reaches a predetermined downward position before a predetermined fluid pressure is reached, means independent of said pressure switch and operatively connected to said valve means for actuation thereof to stop the upward movement of the tramper when it reaches a predetermined upward position, means to supply material to the press box when the tramper reaches said predetermined upward position, and control means operatively connected to said pressure switch and effective only upon actuation of said pressure switch to stop the tramper when the tramper is out of the press box.

References Cited in the file of this patent
UNITED STATES PATENTS

| | | |
|---|---|---|
| 1,074,642 | Murray | Oct. 7, 1913 |
| 1,513,458 | Jacob | Oct. 28, 1924 |
| 2,169,667 | Streun | Aug. 15, 1939 |
| 2,367,241 | Stacy | Jan. 16, 1945 |
| 2,768,574 | Seltzer | Oct. 30, 1956 |
| 2,837,022 | Day | June 3, 1958 |
| 2,882,816 | Van Doorn et al. | Apr. 21, 1959 |